(No Model.)
J. W. BOUGHTON.
INSECT SCREEN.
No. 411,640. Patented Sept. 24, 1889.
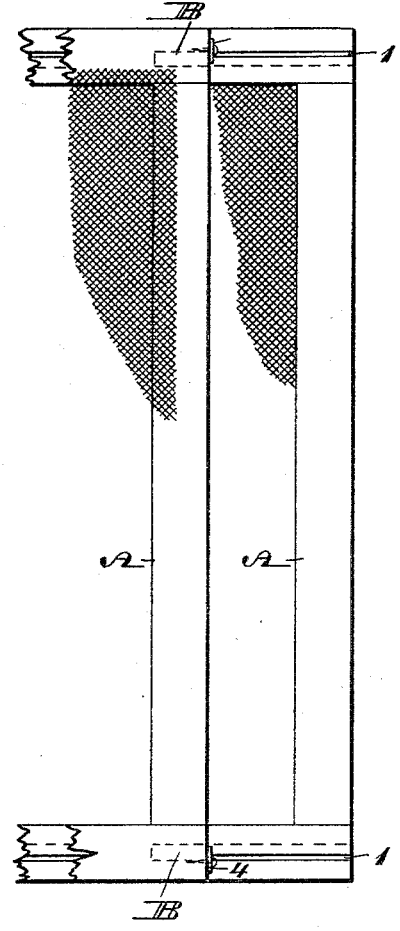
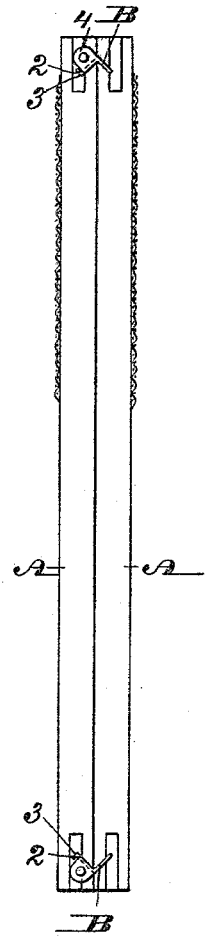
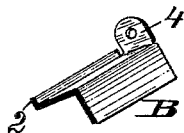
Witnesses
Theo. Rolle.
A. P. Jennings.
Inventor
John W. Boughton
By his Attorneys
Wiedersheim & Kühnes.

UNITED STATES PATENT OFFICE.

JOHN W. BOUGHTON, OF PHILADELPHIA, PENNSYLVANIA.

INSECT-SCREEN.

SPECIFICATION forming part of Letters Patent No. 411,640, dated September 24, 1889.

Application filed August 30, 1888. Serial No. 284,126. (No model.)

*To all whom it may concern:*

Be it known that I, JOHN W. BOUGHTON, a citizen of the United States, residing in the city and county of Philadelphia, State of Pennsylvania, have invented a new and useful Improvement in Insect-Screens, which improvement is fully set forth in the following specification and accompanying drawings.

My invention consists of means for connecting the sliding frames of insect-screens in a strong and reliable manner, as will be hereinafter fully set forth.

Figure 1 represents a side elevation of a portion of a window-screen embodying my invention. Fig. 2 represents an end view thereof. Fig. 3 represents a perspective view of the connecting or fastening device thereof.

Similar letters and numerals of reference indicate corresponding parts in the several figures.

Referring to the drawings, A represents the sliding frames of a mosquito or insect screen to which netting is applied, as usual. In the contiguous faces of the top and bottom bars of the frames are grooves or kerfs 1, which extend obliquely in reversed directions, so that each pair of grooves is of the form of the letter V, the upper pair, however, being that of an inverted V.

B represents tongues, which are V-shaped or angular in cross-section and fitted in the grooves 1, it being noticed that one limb of each tongue is immovable in the respective groove of one of the frames A, and freely enters the groove of the other frame, whereby the frames are connected and may slide upon each other for the purpose of lengthening or shortening the screen, so as to be adapted to windows of different sizes, and for purposes of application and removal, as is evident. The limbs of the tongues are formed with lips 2, which extend angularly therefrom and enter grooves 3, each of which is continuous of one of the grooves 1. By this provision the tongues have increased surfaces without necessarily increasing the vertical dimensions thereof, and the tongues are prevented from being wrenched from the frames when the latter are subjected to outward or inward strain, and thus the strength of the screen is increased. At the ends of the tongues are ears 4, which extend at a right angle to the tongues, so as to be parallel with the ends of the frames, whereby by means of screws passed through said ears into the frames the tongues are firmly connected with the frames and prevented from displacement. Each tongue with its lip and ear may be formed in one piece of cast, sheet, or wrought metal or other material.

I am aware that it is not new to construct adjustable window-screens the frames of which are provided with grooves adapted to receive the limb of a tongue secured to the other frame, so that said frames may be moved one on the other; but I am not aware that the particular construction herein set forth and claimed is old.

Having thus described my invention, what I claim as new, and desire to secure by Letters Patent, is—

An insect-screen consisting of frames with netting thereon and having longitudinal grooves extending obliquely in reverse directions in the contiguous faces of their top and lower bars, additional grooves communicating with said obliquely-extending grooves, and angular-shaped tongues having angular lips at their outer ends and provided with an ear connected to the side of one of the limbs and extending at a right angle thereto, said parts being combined substantially as described.

JOHN W. BOUGHTON.

Witnesses:
JOHN A. WIEDERSHEIM,
JAMES F. KELLY.